(12) United States Patent
Lee et al.

(10) Patent No.: US 7,092,236 B2
(45) Date of Patent: Aug. 15, 2006

(54) MULTILAYER CHIP CAPACITOR

(75) Inventors: Byoung Hwa Lee, Sungnam (KR); Chang Hoon Shim, Yongin (KR); Hae Suk Chung, Kangnam-ku (KR); Dong Seok Park, Sungbook-ku (KR); Sang Soo Park, Suwon (KR); Min Cheol Park, Anyang (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 0 days.

(21) Appl. No.: 11/068,825

(22) Filed: Mar. 2, 2005

(65) Prior Publication Data

US 2006/0158827 A1 Jul. 20, 2006

(30) Foreign Application Priority Data

Jan. 20, 2005 (KR) .................... 10-2005-0005513
Feb. 28, 2005 (KR) .................... 10-2005-0016874

(51) Int. Cl.
*H01G 4/06* (2006.01)
*H01G 4/005* (2006.01)
*H01G 4/228* (2006.01)

(52) U.S. Cl. .................... 361/311; 361/303; 361/306.3
(58) Field of Classification Search ........ 361/303–305, 361/306.1, 306.2, 306.3, 308.1, 309–312
See application file for complete search history.

(56) References Cited

U.S. PATENT DOCUMENTS

| 4,241,378 | A | * | 12/1980 | Dorrian ....................... 361/305 |
| 5,880,925 | A | | 3/1999 | DuPre et al. |
| 6,144,547 | A | * | 11/2000 | Retseptor .................... 361/303 |
| 6,191,932 | B1 | | 2/2001 | Kuroda et al. |
| 6,441,459 | B1 | | 8/2002 | Togashi et al. |
| 6,850,404 | B1 | | 2/2005 | Engel et al. |
| 6,914,767 | B1 | | 7/2005 | Togashi et al. |
| 2004/0179325 | A1 | * | 9/2004 | Togashi et al. .......... 361/306.3 |
| 2005/0047059 | A1 | | 3/2005 | Togashi |

FOREIGN PATENT DOCUMENTS

| EP | 0246134 | * | 11/1987 |
| JP | 6-224071 | * | 8/1994 |
| JP | 2002-151349 | | 5/2002 |
| JP | 2002-164256 | | 6/2002 |

OTHER PUBLICATIONS

Translation of EPO 0 246 134 a1.*

* cited by examiner

*Primary Examiner*—Eric W. Thomas
(74) *Attorney, Agent, or Firm*—Lowe Hauptman & Berner, LLP.

(57) ABSTRACT

A multilayer chip capacitor, which reduces ESL generated due to current flowing through external electrodes and assures an improved mechanical strength. The multilayer chip capacitor includes an upper dummy layer and a lower dummy layer; a plurality of internal electrodes interposed between the upper and lower dummy layers; and external electrodes connected to the internal electrodes, wherein the thickness of the lower dummy layer is smaller than the thickness of the upper dummy layer.

18 Claims, 15 Drawing Sheets

MULTILAYER CHIP CAPACITOR

RELATED APPLICATIONS

The present invention is based on, and claims priority from, Korean Application Number 2005-5513, filed Jan. 20, 2005, and Korean Application Number 2005-16874, filed Feb. 28, 2005, the disclosures of which are incorporated by reference herein in their entirety.

BACKGROUND OF THE INVENTION

1. Field of the Invention

The present invention relates to a multilayer chip capacitor, and more particularly to a multilayer chip capacitor, which has a low equivalent serial inductance (ESL) in a high frequency circuit.

2. Description of the Related Art

Generally, multilayer chip capacitors have a small size, achieve high capacitance, and are easily mounted on a substrate, thus being widely used in various electronic apparatuses. Multilayer chip capacitors are used as capacitive components of high frequency circuits, particularly as decoupling capacitors arranged in power supply circuits of LSI. In order to use a multilayer chip capacitor in a high-frequency circuit, the multilayer chip capacitor must have a low ESL value. The above requirement is increased according to high frequency and high current trends of electronic apparatuses.

U.S. Pat. No. 5,880,925 proposes that respective lead structures of first internal electrodes are located adjacent respective lead structures of second internal electrodes in an interdigitated arrangement to reduce the ESL of the multilayer chip capacitor. The above arrangement is shown in FIG. 1a.

FIG. 1a is an exploded perspective view illustrating shapes of internal electrodes of a conventional multilayer chip capacitor. FIG. 1b is a schematic perspective view of the conventional multilayer chip capacitor manufactured using the internal electrodes of FIG. 1a. FIG. 1c is a sectional view of the multilayer chip capacitor of FIG. 1b as taken along the line X–X'. With reference to FIG. 1a, internal electrodes 14 are formed on a plurality of dielectric layers 11a and 11b made of ceramic. The internal electrodes 14 are divided into first internal electrodes 12 and second internal electrodes 13 having different polarities. Leads 16 of the first internal electrodes 12 and leads 17 of the second internal electrodes 13 are connected to respective ones of external electrodes 18 (in FIG. 1b). The leads 16 of the first internal electrodes 12 are located adjacent the leads 17 of the second internal electrodes 13 in an interdigitated arrangement. Since the polarities of the voltages supplied to the nearby leads differ, the magnetic fluxes generated due to the high frequency currents flowing from the external electrodes are canceled out between theses adjoining leads. Therefore, the ESL is reduced. However, such reduced amount of the ESL does not satisfy the level required for the decoupling capacitors for high frequency circuit.

As shown in FIGS. 1b and 1c, in the conventional multilayer chip capacitor 10, the internal electrodes 14 are located at the central portion of the capacitor main body 20 such that a cross section of a capacitor main body 20 has a lower-upper symmetrical structure with regard to a central line (L). That is, the capacitor main body 20 includes a lower dummy layer 51, an upper dummy layer 52 and an active layer 50 between the lower and the upper dummy layers 51 and 52. The lower and the upper layers 51 and 52 have the same thickness (a). The active layer 50 has a plurality of the internal electrodes 14. As shown in FIG. 1a, the dielectric layers 11a and 11b are interposed between the internal electrodes 14. The dummy layers 51 and 52 correspond to the regions without internal electrodes which substantially contribute to capacitance. On the contrary, the active layer 50 corresponds to the region with internal electrodes which substantially contribute to capacitance. The dummy layers 51 and 52 serve to protect the internal electrodes 14 and to assure a designated thickness of the multilayer chip capacitor 10. The lower and upper dummy layers 51 and 52 are made of the same material as that of the dielectric layers 11a and 11b.

When the internal electrodes 14 are located at the central portion of the capacitor main body 20, a distance (a) from the bottom surface (the surface attached to a pad of a substrate) of the multilayer chip capacitor 10 mounted on a substrate to the lowermost internal electrode 14 is elongated. That is, the thickness (a) of the lower dummy layer 51 is comparatively increased by locating the internal electrodes 14 at the central portion of the capacitor main body 20. When the thickness (a) of the lower dummy layer 51 is increased, the ESL component generated due to current flowing through the external electrodes 18 from the bottom surface is increased. Particularly, in a multilayer chip capacitor with multi-terminals more than 2 terminals, the above ESL component occupies a considerable portion of the overall ESL of the multilayer chip capacitor.

FIG. 1d is a sectional view of the multilayer chip capacitor of FIG. 1b as taken along the line A–A'. FIG. 1e is a schematic view showing a model of the equivalent serial inductance of the mutilayer chip capacitor of FIG. 1d. As shown in FIG. 1e, the conventional mutilayer chip capacitor 10 has the inductance ($L_h$) in the region H and the inductances ($L_v$) in the regions $V_1$ and $V_2$. Thus, the total inductance of the multiplayer chip capacitor is $L_h+2L_v$. Therefore, as the thickness (a) of the lower dummy layer 51 is increase, the ESL of the capacitor is increase.

Additionally, in the conventional multiplayer chip capacitor 10, each of the internal electrodes 14 has four leads, resulting in smaller ESR (equivalent serial resistance). When each of internal electrodes 12 or 13 has four leads as shown in FIG. 1a, the resistances generated from the leads are parallel connected. As a result, the total resistance of the capacitor 10 becomes extremely small. If the ESR is extremely small, it is hard to meet the target impedance and impossible to design power distribution network stably.

In order to prevent the ESR from reducing extremely, U.S. Pat. No. 6,441,459 proposes that each of internal electrodes has one lead to increase to the ESR. However, according to the U.S. Patent, the ESL is increased, and the ESR is not controllable.

In order to solve the problems of the increase in the ESL component, as shown in FIG. 2, a lower dummy layer 51' and an upper dummy layer 52' may have a reduced thickness (b'), thus resulting in a thin multilayer chip capacitor. However, when the multilayer chip capacitor is excessively thin, the mechanical strength of the multilayer chip capacitor is decreased. For example, when the multilayer chip capacitor is designed to have a thickness of less than 0.3 mm, the capacitor is easily broken or damaged during the manufacturing process thereof, thus deteriorating a production yield of chip capacitors. Particularly, the above mechanical damage of the capacitor is highly generated when the capacitor main body is polished after sintering or when the manufactured multilayer chip capacitor is mounted on a substrate.

SUMMARY OF THE INVENTION

Therefore, the present invention has been made in view of the above problems, and it is an object of the present invention to provide a multilayer chip capacitor, which reduces the ESL component generated due to current flowing through external electrodes from the bottom surface of the capacitor.

It is another object of the present invention to provide a multilayer chip capacitor, which has a sufficient overall thickness, thereby reducing mechanical damage and having an improved production yield.

It is still another object of the present invention to provide a mutilayer chip capacitor, which can prevents the ESR from reducing extremely and control the ESR easily.

In accordance with one aspect of the present invention, a multilayer chip capacitor is provided which comprises: an upper dummy layer and a lower dummy layer; a plurality of internal electrodes interposed between the upper and lower dummy layers; and external electrodes connected to the internal electrodes, wherein the thickness of the lower dummy layer is smaller than the thickness of the upper dummy layer.

Preferably, the ratio of the thickness of the lower dummy layer to the thickness of the upper dummy layer may be 0.8 or less than 8.

Since the thickness of the lower dummy layer is smaller than the thickness of the upper dummy layer, the multilayer chip capacitor has a reduced ESL value as well as a sufficient mechanical strength.

In case that the multilayer chip capacitor of the present invention has a lower-upper asymmetrical sectional structure, it is necessary to distinguish between upper and lower surfaces of the capacitor in order to mount the capacitor correctly on a substrate. The distinguishing between the upper and lower surfaces of the capacitor is achieved by sensing different colors exhibited by the upper and lower surfaces of the capacitor. Alternately, a mark for distinguishing between the upper and lower surfaces of the capacitor is put on the capacitor. The mark is made of, for example, colored glass.

On the contrary, in case that the multilayer chip capacitor of the present invention has an lower-upper symmetrical sectional structure, it is not necessary to distinguish between upper and lower surfaces of the capacitor. Therefore, a mark is not needed. The capacitor can be mounted on a substrate without distinction of the upper and lower surfaces.

In accordance with one embodiment of the present invention, thin dielectric layers are formed between the plural internal electrodes; and the upper and lower dummy layers are made of the same material as that of the thin dielectric layers. In this case, since the thickness of the upper dummy layer is larger than the thickness of the lower dummy layer, the mechanical strength of the capacitor is improved.

In accordance with another embodiment of the present invention, thin dielectric layers are formed between the plural internal electrodes; and the upper dummy layer includes: an upper dummy dielectric layer made of the same material as that of the thin dielectric layers; and an upper reinforcing layer formed on the upper dummy dielectric layer and made of the different material from that of the thin dielectric layers. The upper reinforcing layer increases the overall thickness of the capacitor, and improves the mechanical strength of the capacitor. The upper reinforcing layer is made of plastic, glass, or ceramic.

In accordance with still another embodiment of the present invention, one or more internal electrodes can be further included on the upper dummy layer. In this case, the mulilayer chip capacitor may have a lower-upper asymmetric sectional structure or a lower-upper symmetric sectional structure.

The multilayer chip capacitor of the present invention may be a multilayer chip capacitor having multiple external electrodes provided with leads disposed in an interdigitated arrangement. For example, the multilayer chip capacitor of the present invention may be an eight, ten, or twelve terminal-type multilayer chip capacitor. The multilayer chip capacitor of the present invention may be also a two terminal-type multilayer chip capacitor.

In accordance with another aspect of the present invention, a multilayer chip capacitor is provided which comprises: an upper dummy layer and a lower dummy layer; a plurality of first internal electrodes and second electrodes interposed between the upper and lower dummy layers; and external electrodes connected to the internal electrodes, wherein the thickness of the lower dummy layer is smaller than the thickness of the upper dummy layer, and either or both of the first and the second internal electrodes have one or more slots. The first and the second electrodes are separated by dielectric layers and alternately stacked. Each of the first and the second electrodes have one or more leads connected to the external electrodes.

In accordance with one embodiment of the present invention, each of the first and the second electrodes have a pair of adjacent rectangular conductive patterns. In each of the pair of conductive patterns, one or more slots are formed from one or more sides toward the center of each conductive pattern to change a direction of the electric current within the conductive pattern.

In this case, through adjacent areas of the pair of conductive patterns, electric currents in opposite directions to each other flow. The pair of conductive patterns may have a same polarity. Alternatively, the pair of conductive patterns may have different polarities.

In accordance with one embodiment of the present invention, electric currents may flow in the first and second internal electrodes in directions perpendicular to each other.

In this case, each of the first internal electrodes may have a first rectangular conductive pattern, wherein two slots extended from two opposing sides of the first conductive pattern toward the center of the first conductive pattern are formed. Each of the second internal electrodes may have a second rectangular conductive pattern, wherein two slots perpendicular to the slots of the first conductive pattern are formed in the second conductive pattern while the slots of the second conductive pattern being extended from two opposing sides of the second conductive pattern toward the center of the second conductive pattern.

Alternatively, each of the first electrodes may have a pair of first conductive patterns which are divided by a first slot. In this case, each of the second electrodes has a rectangular second conductive pattern, wherein two second slots perpendicular to the first slot are formed in the second conductive pattern while the second slots being extended from the opposing sides of the second conductive pattern toward the center of the second conductive pattern.

Still alternatively, each of the first electrodes may have a first conductive pattern, while each of the second electrodes have a pair of second patterns divided by a slot.

The terms used in this specification are defined as follows.

A "dummy layer" is a region without internal electrodes which substantially contribute to capacitance. A "active layer" is a region with internal electrodes which substantially contribute to capacitance. Therefore, a multilayer chip capacitor may have more than one active layers.

A "lower dummy layer" is a dummy layer disposed between the bottom surface to the lowermost internal electrode of a multilayer chip capacitor. A "upper dummy layer" is a dummy layer disposed most closely to the lower dummy layer and separated by a active layer. Thus, another internal electrode or active layer can be disposed on the upper dummy layer. Also, another dummy layer can be disposed over the upper dummy layer (See FIGS. 10 and 11). The bottom surface (or the lower surface) of a capacitor is the surface attached to a pad of a substrate when the capacitor is mounted on the substrate. The upper surface of a capacitor is the surface opposing to the bottom surface.

BRIEF DESCRIPTION OF THE DRAWINGS

The above and other objects, features and other advantages of the present invention will be more clearly understood from the following detailed description taken in conjunction with the accompanying drawings, in which:

FIG. 1b is a schematic perspective view of the conventional multilayer chip capacitor manufactured using the internal electrodes of FIG. 1a;

DESCRIPTION OF THE PREFERRED EMBODIMENTS

Figure 1A:
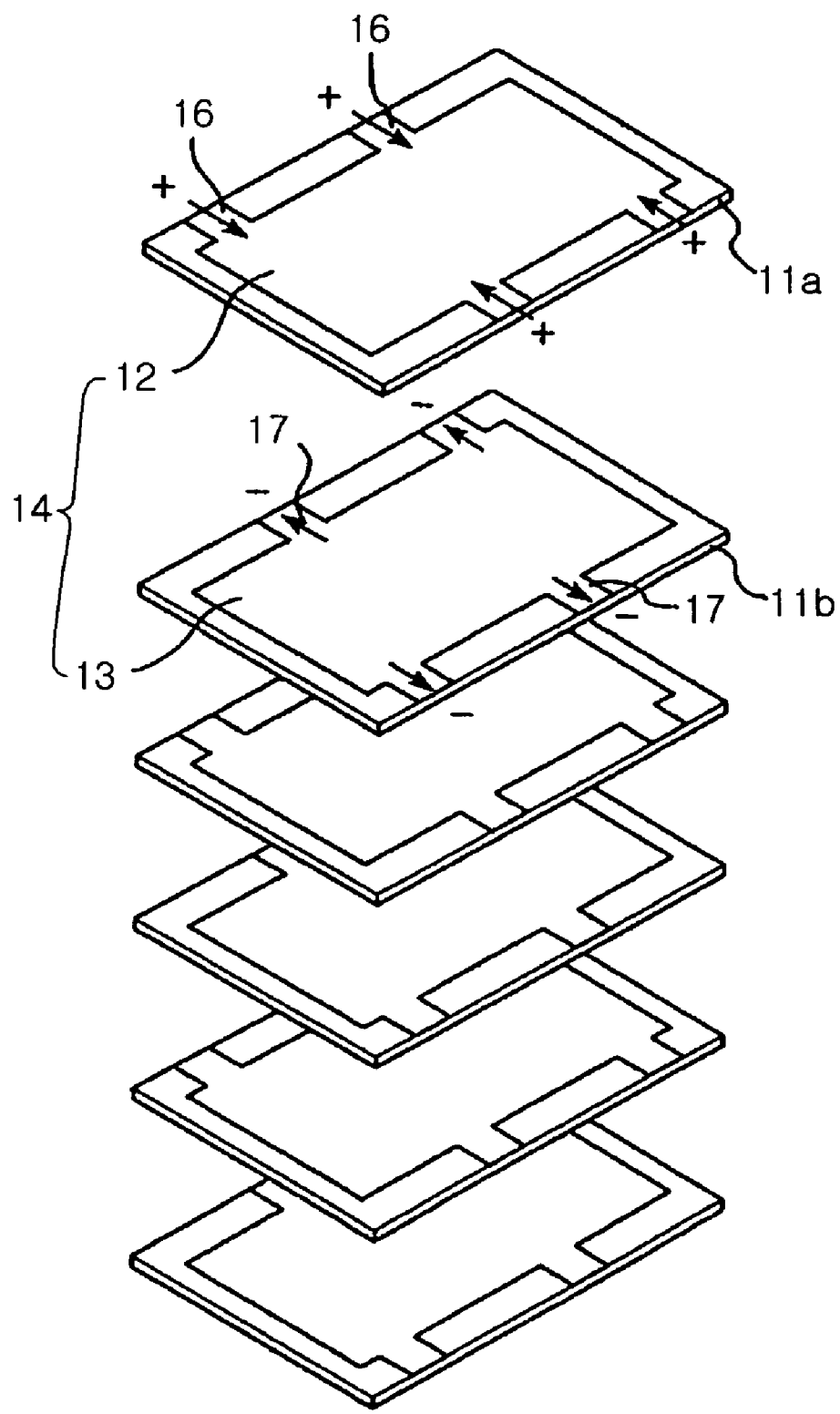
FIG. 1a is an exploded perspective view illustrating shapes of internal electrodes of a conventional multilayer chip capacitor.
Figure 1B:
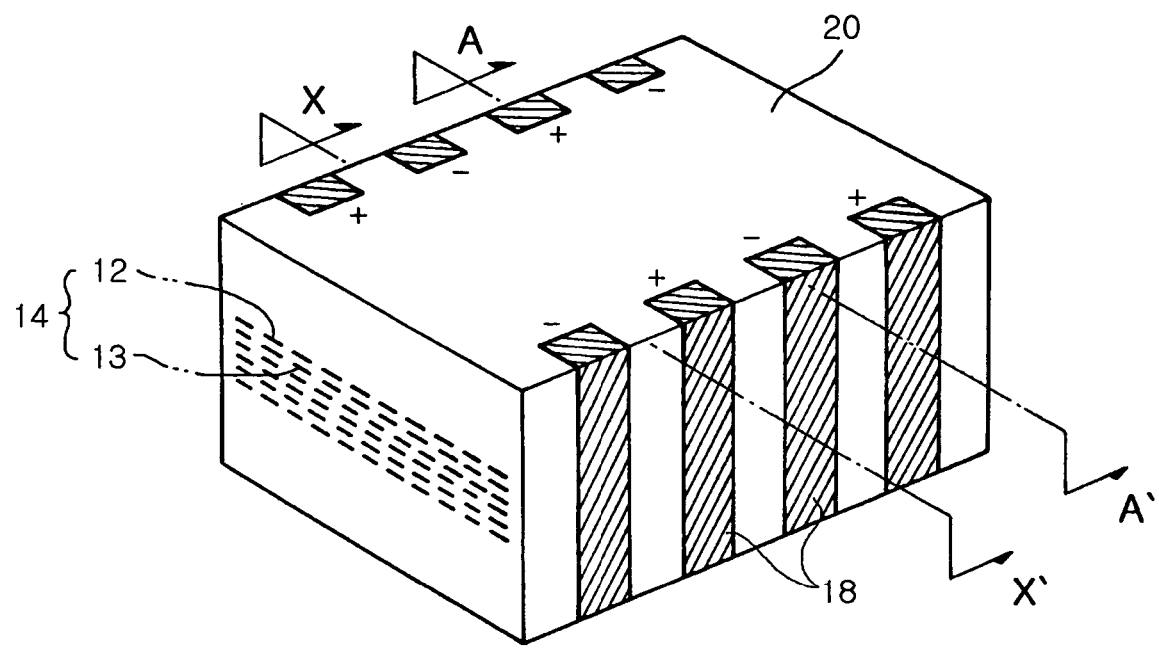

Now, preferred embodiments of the present invention will be described in detail with reference to the annexed drawings. The embodiments of the present invention may be variously modified. The above embodiments does not limit the scope of the invention, but have been made only for a better understanding of the invention. Accordingly, shapes and sizes of elements of accompanying drawings may be enlarged for clear description, and some elements, which are substantially the same, are denoted by the same reference numerals even though they are depicted in different drawings.

Figure 3:
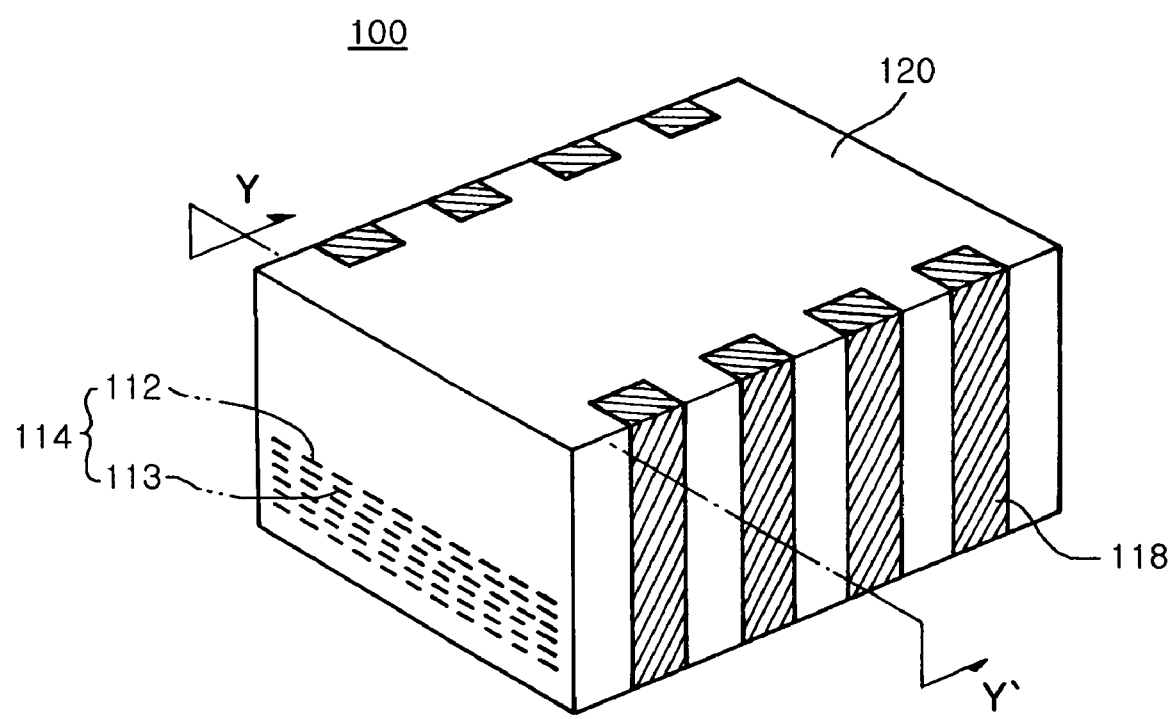
FIG. 3 is a schematic perspective view of a multilayer chip capacitor in accordance with one embodiment of the present invention.

FIG. 3 is a schematic perspective view of a multilayer chip capacitor in accordance with one embodiment of the present invention. With reference to FIG. 3, a multilayer chip capacitor 100 comprises a capacitor main body 120, in which a plurality of internal electrodes 114 are formed, and a plurality of external electrodes 118 formed on the outer surface of the capacitor main body 120. The internal electrodes 114 are divided into first internal electrodes 112 and second internal electrodes 113, which have different polarities, and are disposed close to the lower surface of the capacitor 100 rather than the upper surface of the capacitor 100. The internal electrodes 114 have leads, which are arranged close to each other and are interdigitated. The present invention may be applied to any multilayer chip capacitor having other internal electrode structures as well as the multilayer chip capacitor having the internal electrode structure shown in FIG. 1a.

Figure 9:
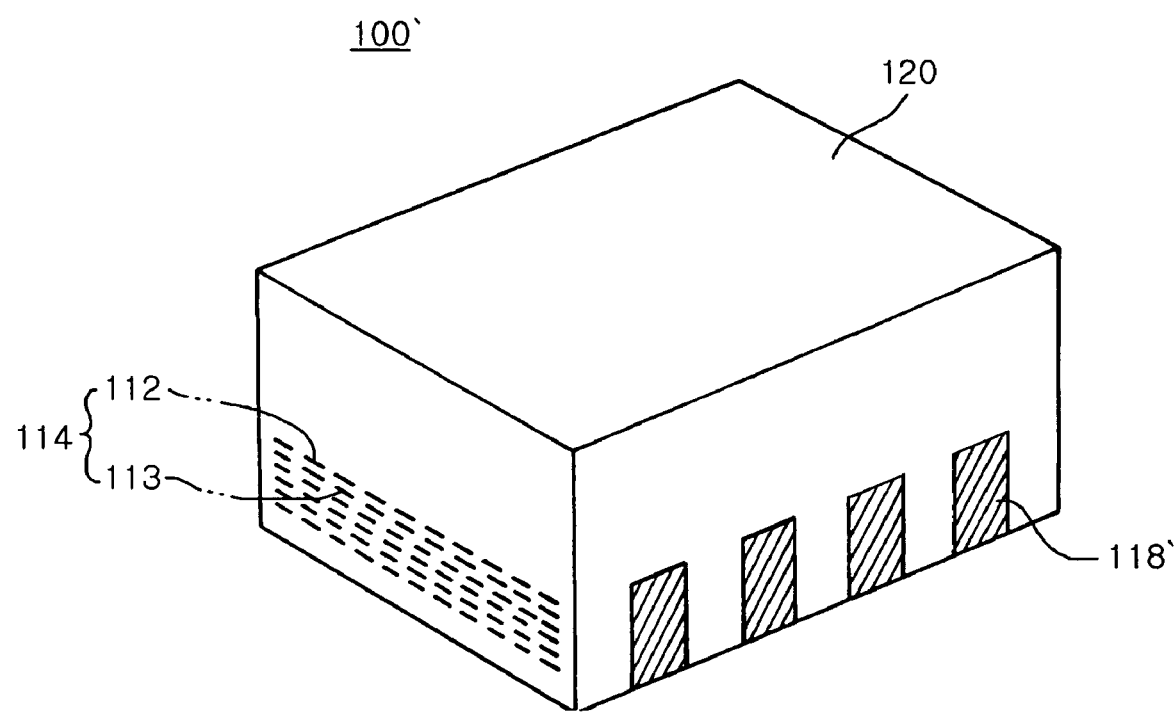
FIG. 9 is a schematic perspective view of a modified example of the multilayer chip capacitor of FIG. 3.

In FIG. 3, the external electrodes 118 are extended from the bottom surface of the capacitor main body 120 to the upper end of the capacitor main body 120. Alternately, the external electrodes 118 may be extended from the bottom surface of the capacitor main body 120 only to the height of the uppermost internal electrode 112. The above example is shown in FIG. 9. With reference to FIG. 9, external electrodes 118' of a multilayer chip capacitor 100' are extended from the bottom surface of the capacitor main body 120 to a position corresponding to the height of the uppermost internal electrode 112, and are not substantially formed on the outer surface of the capacitor main body 120 located higher than the height of the uppermost internal electrode 112.

Figure 4:
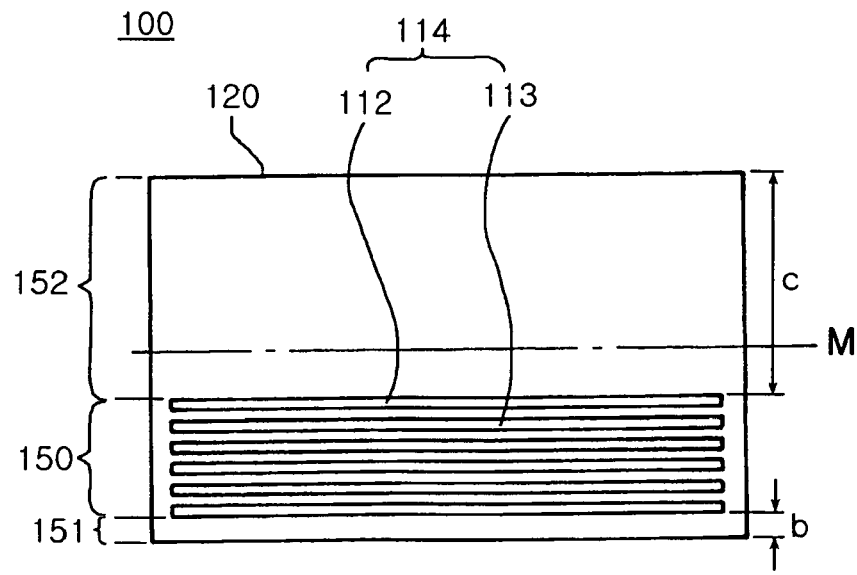
FIG. 4 is a sectional view taken along the line Y–Y' of FIG. 3.

FIG. 4 is a sectional view taken along the line Y–Y' of FIG. 3. With reference to FIG. 4, the capacitor main body 120 includes a lower dummy layer 151, an upper dummy layer 152, and a plurality of the internal electrodes 114 interposed between the lower and upper dummy layers 151 and 152. Dielectric layers are formed between the plural internal electrodes 114. The lower and upper dummy layers 151 and 152 are made of the same material as that of the dielectric layers. As shown in FIG. 4, the lower dummy layer 151 has a thickness (b) smaller than the thickness (a) of the upper dummy layer 152. Thereby, the capacitor main body 120 has an asymmetrical sectional structure with regard to a central line (M). Preferably, the ratio of the thickness (b) of the lower dummy layer 151 to the thickness (a) of the upper dummy layer 152 is 0.8 or less than 0.8.

By forming the above asymmetrical sectional structure, the thickness (b) of the lower dummy layer 151 is reduced, thus reducing an ESL value generated due to current flowing through the external electrodes 118. Further, since the upper dummy layer 152 has the thickness (a) larger than the thickness (b) of the lower dummy layer 151, the multilayer chip capacitor 100 has a sufficient overall thickness, thereby preventing the mechanical strength of the capacitor 100 from being deteriorated.

As described above, since the multilayer chip capacitor 100 has the asymmetrical sectional structure, when the capacitor 100 is mounted on a substrate, it is necessary to distinguish between the upper and lower surfaces of the capacitor 100. That is, in order to reduce the ESL value generated due to current flowing through the external electrodes 118, the capacitor is mounted on the substrate under the condition that the lower dummy layer 151 faces the substrate. The above distinction between the upper and lower surfaces of the capacitor 100 is achieved by allowing a sensor to sense different colors exhibited by the upper and lower surfaces of the capacitor 100.

Specifically, since the thickness (b) of the lower dummy layer 151 is smaller than the thickness (c) of the upper dummy layer 152, when the capacitor 100 is viewed from the outside, the lower surface of the capacitor 100 exhibits a color darker than that of the upper surface of the capacitor 100. Generally, the lower and upper dummy layers 151 and 152 are made of semitransparent dielectric material, and the internal electrodes 114 exhibit a dark color (for example, a dark blue color). Accordingly, since the lower dummy layer 151 has the thickness (b) smaller than the thickness (c) of the upper dummy layer 152, the lower surface of the capacitor 100 exhibits a blue color, and the upper surface of the capacitor 100 exhibits a light brown color. By allowing the sensor to sense the different colors exhibited by the lower and upper surfaces of the capacitor 100, the upper and lower surfaces of the capacitor 100 are distinguished from each other and the lower surface of the capacitor 100 is mounted on a printed circuit board or a receipt tape.

Figure 5:
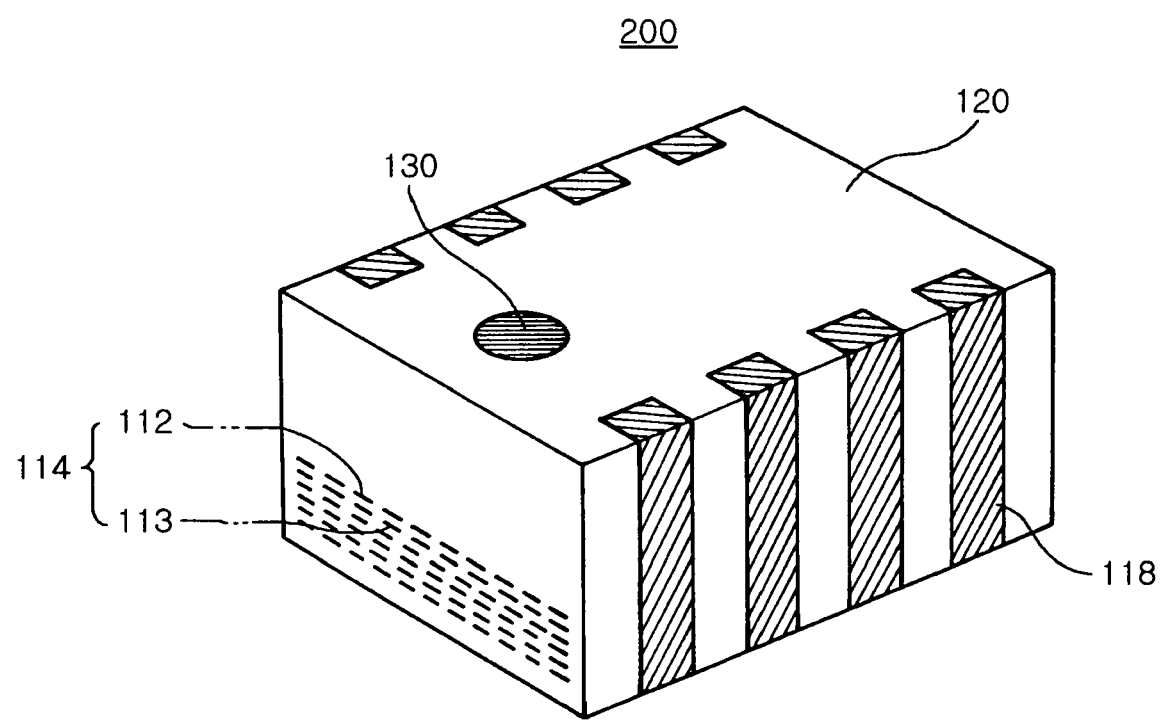
FIG. 5 is a schematic perspective view of a multilayer chip capacitor in accordance with a further embodiment of the present invention.

As another method for distinguishing between the upper and lower surfaces of the capacitor, a designated mark is printed on the upper surface of the capacitor. FIG. 5 illustrates a multilayer chip capacitor provided with a mark for distinguishing between upper and lower surfaces of the capacitor.

The multilayer chip capacitor 200 shown in FIG. 5 is the same as the multilayer chip capacitor 100 shown in FIG. 3 except that a mark 130 for distinguishing between the upper and lower portions of the capacitor 200 is printed on the upper surface of the capacitor 200. By printing the mark 130 on the upper surface of the multilayer chip capacitor 200, it is possible to easily and precisely distinguish between the upper and lower surfaces of the capacitor 200. For example, the mark 130 of the multilayer chip capacitor 200 is obtained by forming a mark having a designated shape on a dielectric layer using screen printing and then stacking the dielectric layer on the uppermost layer of the capacitor 200. The mark formed using screen printing is made of colored glass material (for example, exhibiting a dark blue color). By allowing a sensor to sense the mark 130 of the capacitor 200 printed by the above procedure, it is possible to easily and precisely distinguish between the upper and lower surfaces of the capacitor 200.

Although the above embodiments respectively describe multilayer chip capacitors having eight external electrodes, the present invention is not limited thereto. For example, as shown in FIG. 6, the present invention may be applied to a multilayer chip capacitor having two external electrodes.

Figure 6:
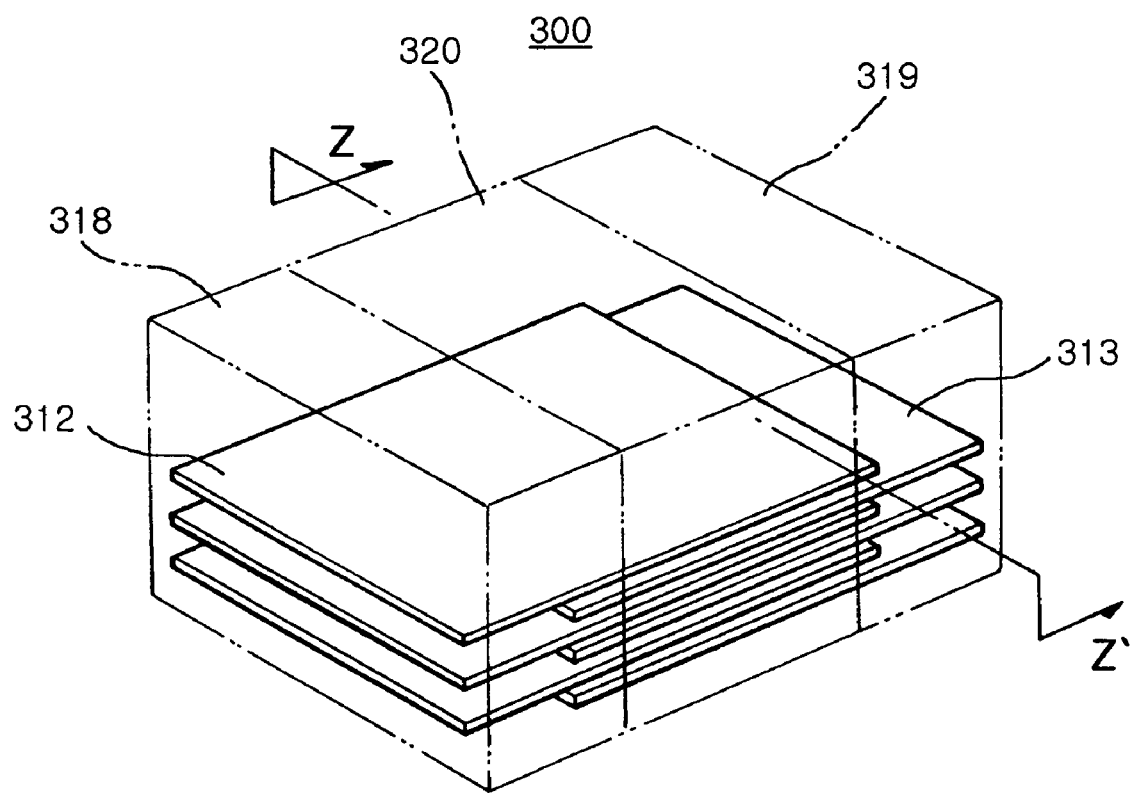
FIG. 6 is a perspective view of a multilayer chip capacitor in accordance with another embodiment of the present invention, illustrating the interior of the multilayer chip capacitor.
Figure 7:
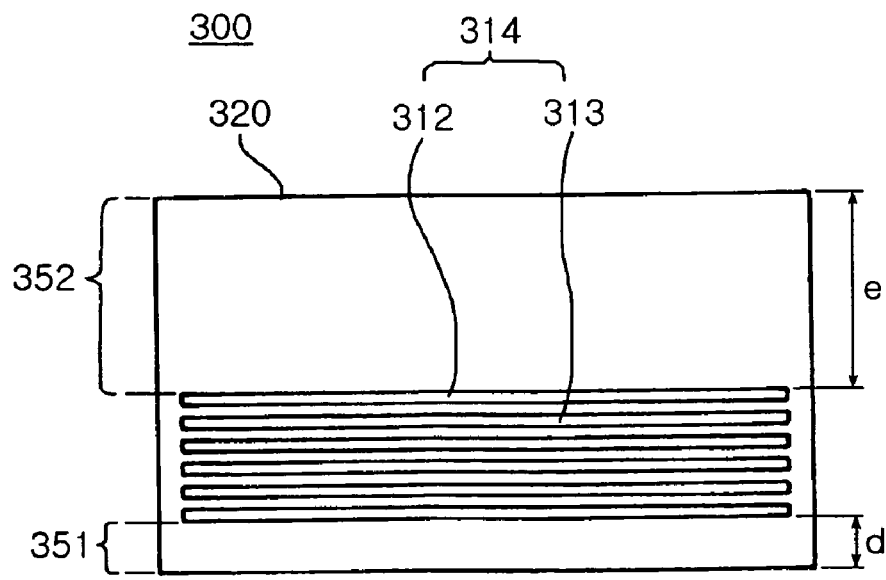
FIG. 7 is a sectional view taken along the line Z–Z' of FIG. 6.

FIG. 6 is a perspective view of a multilayer chip capacitor 300 having two external electrodes in accordance with another embodiment of the present invention, illustrating the interior of the multilayer chip capacitor 300, and FIG. 7 is a sectional view taken along the line Z–Z' of FIG. 6. With reference to FIGS. 6 and 7, external terminals 318 and 319 are respectively formed on both side surfaces of a capacitor main body 320, and a plurality of internal electrodes 314 are formed in the capacitor main body 320. The internal electrodes 314 are divided into first internal electrodes 312 and second internal electrodes 313, which have different polarities. The first internal electrodes 312 and the second internal electrodes 313 are respectively connected to the external electrodes 318 and 319, and are alternately stacked.

As shown in FIG. 7, above two terminal-type multilayer chip capacitor 300 has a lower-upper asymmetrical sectional structure, and a thickness (d) of a lower dummy layer 351 is smaller than a thickness (e) of an upper dummy layer 352. In order to easily distinguish between upper and lower surfaces of the two terminal-type multilayer chip capacitor 300 shown in FIG. 6, a mark is put on the upper surface of the capacitor 300. The present invention may be applied to multilayer chip capacitors having external electrodes prepared in various numbers as well as the above multilayer chip capacitors having eight and two external electrodes.

Figure 8:
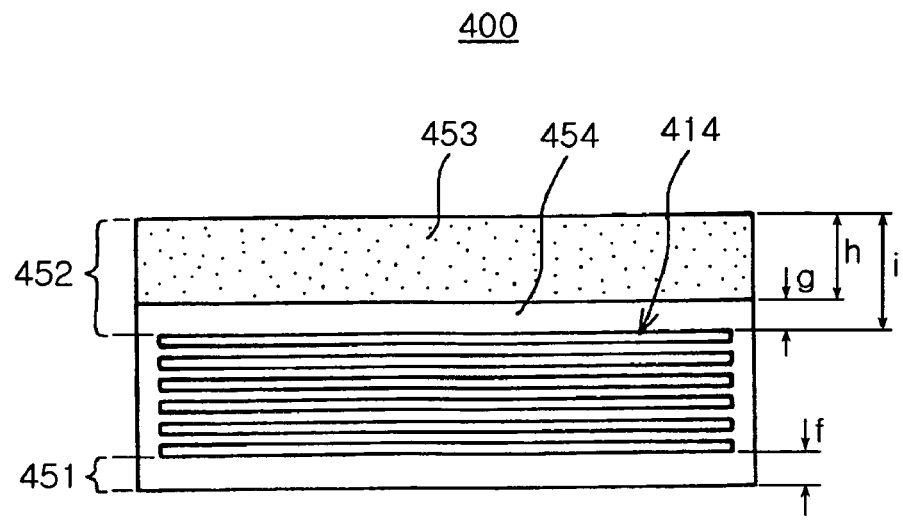
FIG. 8 is a sectional view of a multilayer chip capacitor in accordance with yet another embodiment of the present invention.

FIG. 8 is a sectional view of a multilayer chip capacitor in accordance with yet another embodiment of the present invention. With reference to FIG. 8, the multilayer chip capacitor 400 comprises a lower dummy layer 451 formed under internal electrodes 414, and an upper dummy layer 452 formed on the internal electrodes 414. Thin dielectric layers are disposed between a plurality of the internal electrodes 414. Particularly, in this embodiment, the upper dummy layer 452 has a two-layered structure. Specifically, the upper dummy layer 452 includes an upper dummy dielectric layer 454, and an upper reinforcing layer 453 formed on the upper dummy dielectric layer 454. The upper reinforcing layer 453 serves to reinforce the mechanical strength of the capacitor 400. For example, the upper reinforcing layer 453 is made of plastic, glass, or ceramic material. The lower dummy layer 451 and the upper dummy dielectric layer 454 are made of the same material as that of the dielectric layers disposed between the internal electrodes 414.

In this embodiment shown in FIG. 8, a thickness (f) of the lower dummy layer 451 is smaller than a thickness (i) of the upper dummy layer 452. That is, the thickness (f) of the lower dummy layer 451 is smaller than the sum total of a thickness (g) of the upper dummy dielectric layer 454 and a thickness (h) of the upper reinforcing layer 453, thereby reducing an ESL value generated due to current flowing through external electrodes. Further, the mechanical strength of the capacitor 400 is improved by stacking the upper reinforcing layer 453 on the upper dummy dielectric layer 454.

Figure 10:
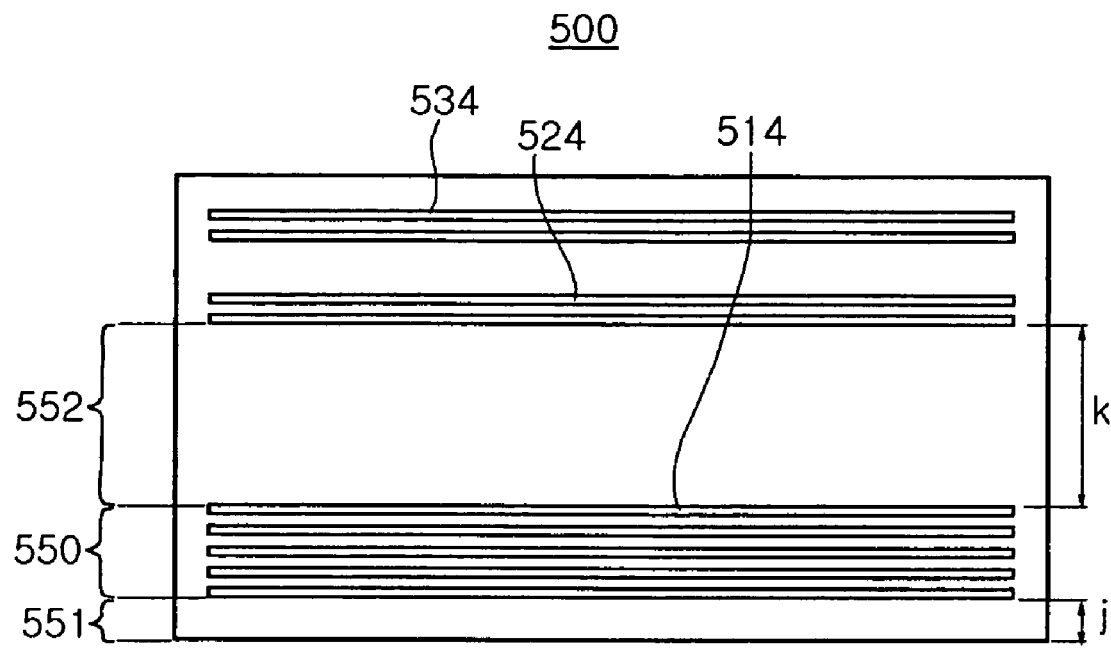
FIG. 10 is a sectional view of a multilayer chip capacitor in accordance with yet another embodiment of the present invention.
Figure 11:
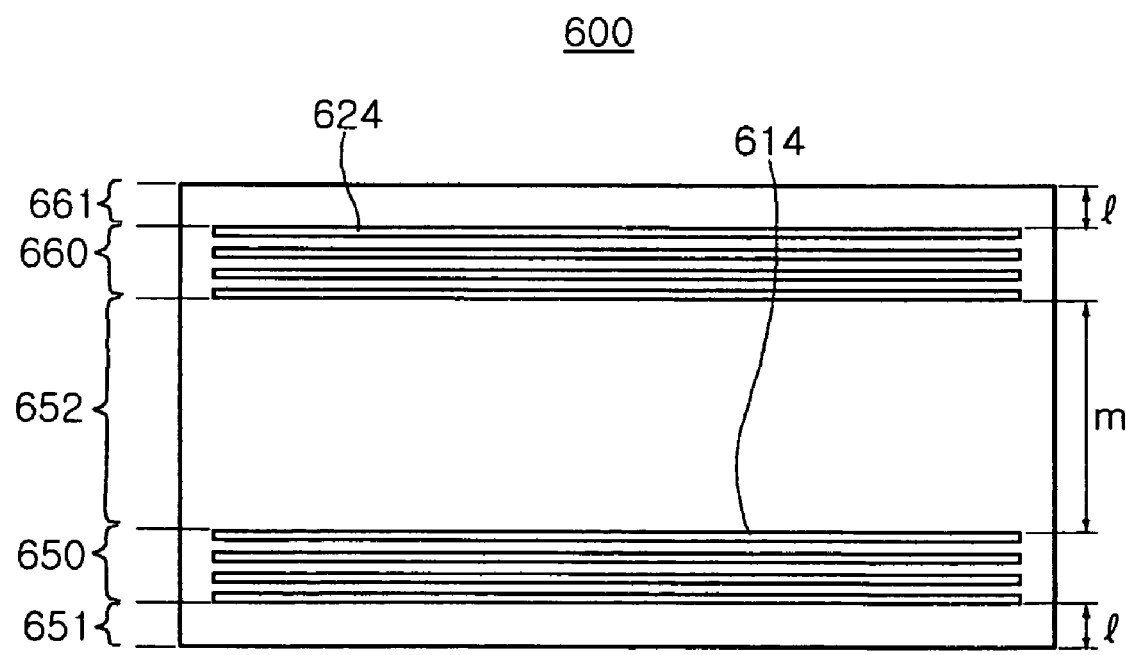
FIG. 11 is a sectional view of a multilayer chip capacitor in accordance with yet another embodiment of the present invention.

FIGS. 10 and 11 are sectional views of multilayer chip capacitors in accordance with other embodiments of the present invention. In these embodiments, additional internal electrodes and/or dummy layers are formed over the upper dummy layer 552 and 652.

With reference to FIG. 10, a capacitor 500 includes a lower dummy layer 551, upper dummy layer 552, and a active layer 550 having internal electrodes interposed between the dummy layers 551 and 552. The thickness (j) of the lower dummy layer 551 is smaller than the thickness (k) of the upper dummy layer 552. Additionally, internal electrodes 524, 534 are disposed over the upper dummy layer 552. Such additional layer can be used in order to adjust the capacitance to the desired value. The capacitor of FIG. 10 has a lower-upper asymmetric sectional structure. Since the distinction between the upper and lower surface of the capacitor is necessary, preferably a mark is put on the upper surface of the capacitor.

On the contrary, the capacitor of FIG. 11 has a lower-upper symmetric sectional structure. As shown in FIG. 11, the capacitor 600 includes a lower dummy layer 651, a first active layer 650, and a upper dummy layer 652. Additionally, the capacitor 600 further includes a second active layer 660 and the uppermost dummy layer 661 over the upper dummy layer 652. The thickness (m) of the upper dummy layer 652 is larger than the thickness (1) of the lower dummy layer 651. The uppermost dummy layer 661 has the same thickness (1) as that of the lower dummy layer 651. The first and the second active layers 650, 660 have a plurality of internal electrodes respectively. Since the capacitor 600 has a lower-upper symmetric sectional structure, the distinction between the upper and lower surface of the capacitor 600 is not needed. Thus, without distinction between the upper and lower surface, the capacitor can be mounted on a substrate (not shown).

According to the present invention, a capacitor may have internal electrode structures which can further reduce the ESL and control the ESR not to reduce the ESR extremely. In such electrode structures, one or more slots are formed.

FIGS. 12 to 17 are plane views showing shapes of internal electrodes included in capacitors according to the present invention.

Figure 12:
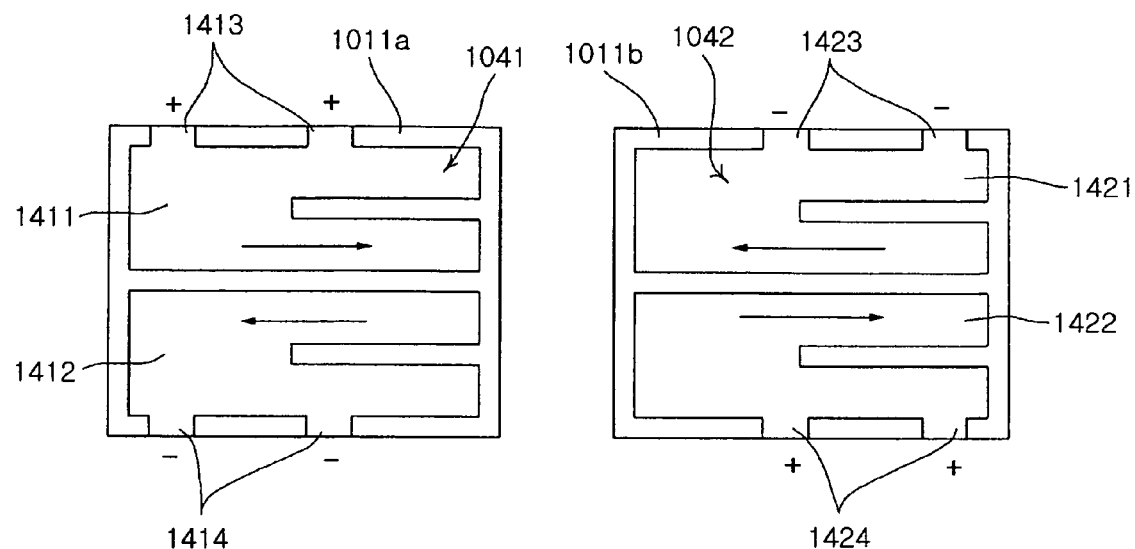
FIG. 12 is a plane view showing internal electrodes of a multilayer chip capacitor in accordance with a first embodiment of the present invention.

FIG. 12 is a plane view showing shapes of internal electrodes of a capacitor according to a first embodiment of the present invention. With reference to FIG. 12, each of first electrodes 1041 and second electrodes 1042 has leads 1413, 1414, 1423, 1424 connected to external electrodes 118 (in FIG. 3). The first and the second internal electrodes are provided with different polarities of voltage, thus canceling the magnetic fluxes generated due to the high frequency currents.

In addition, each of the first and the second internal electrodes 1041, 1042 has a first conductive pattern 1411, 1421 and a second conductive pattern 1412, 1422 disposed on the same plane. A plurality of leads 1413, 1414, 1423, 1424 are connected to external electrodes of + or −polarities.

The first conductive pattern 1411 or 1421 and the second conductive pattern 1412 or 1422 on the same plane have different polarities. In the adjoining area of the first conductive pattern 1411 or 1421 and the second conductive pattern 1412, 1422, electric currents of opposite directions flow, thus canceling the magnetic fluxes generated due the currents. Further, since electric currents of opposite directions flow in the adjoining area of the first internal electrode 1041 and the second internal electrode, the magnetic fluxes are canceled between the first and the second internal electrode 1041, 1042.

In each of the first conductive pattern 1411, 1421 and the second conductive pattern 1412, 1422, a slot extended from the opposing sides toward the center of the conductive pattern is formed respectively. Thus, also within each of the first and the second conductive patterns, the magnetic fluxes are canceled. Therefore the ESL is further reduced.

In addition, since each slot extended toward the center of the conductive pattern elongated the path of current within the conductive pattern, the ESR is prevented from reducing extremely. Also, by adjusting the length of the slot, it is possible to control the ESR to the desired value. Therefore, it is easy to meet the target impedance. Further, the power distribution network can be designed more stably.

In the above embodiment, only one slot is formed in one conductive pattern. However, two or more slot may be formed in each conductive pattern. Further, each of the first internal electrodes or the second internal electrodes may have only one conductive patter. Still further, each of the internal electrodes may have different number of leads or may have only one leads.

Figure 13:
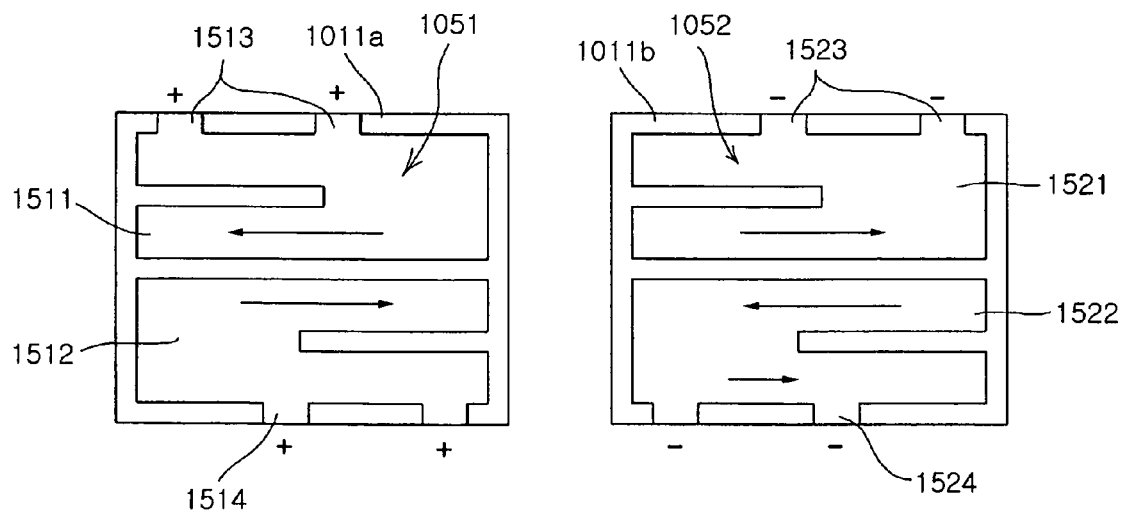
FIG. 13 is a plane view showing internal electrodes of a multilayer chip capacitor in accordance with a second embodiment of the present invention.

FIG. 13 is a plane view showing internal electrodes of a capacitor according to a second embodiment of the present invention. With reference to FIG. 13, the slots formed in the first conductive pattern 1511, 1521 and the second conductive pattern 1512, 1522 are disposed in opposite directions. The first conductive pattern 1511, 1521 and the second conductive pattern 1512, 1522 have same polarity. As shown by arrows in FIG. 13, electric currents of opposite directions flow between the first conductive pattern and the second conductive pattern, between the adjoining first and second internal electrodes, and between the adjoining areas within each internal electrode. Therefore, the magnetic fluxes generated due to the currents are canceled, thus further reducing the ESL. In addition, it is possible to control the ESR through the slots. The symbols 1513, 1514, 1523 and 1524 denote leads.

According to the present invention, between the first and the second internal electrodes, electrical currents may flow in directions perpendicular to each other. FIGS. 14 to 17 illustrate such examples.

Figure 14:
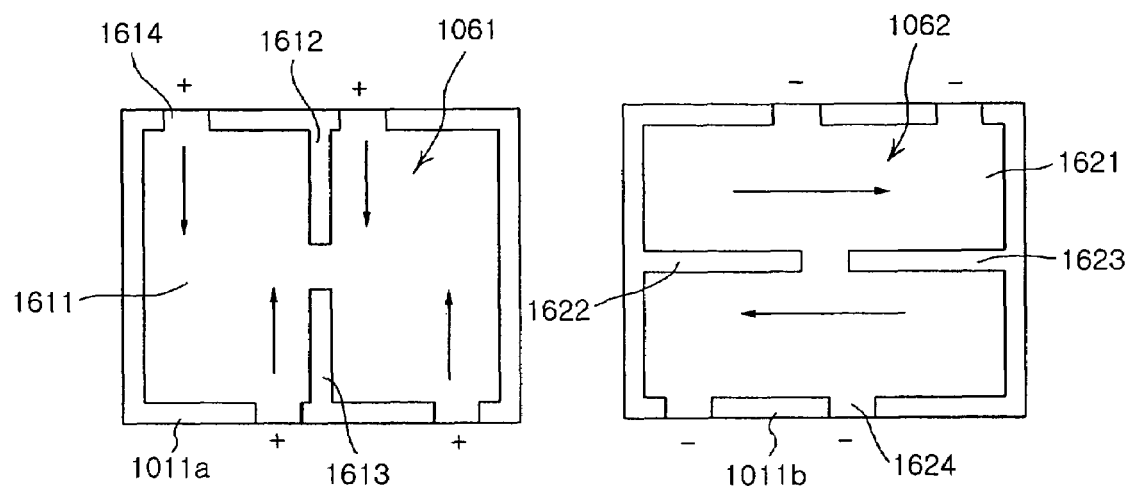
FIG. 14 is a plane view showing internal electrodes of a multilayer chip capacitor in accordance with a third embodiment of the present invention.

FIG. 14 is a plane view showing internal electrodes of a multilayer chip capacitor in accordance with a third embodiment of the present invention. With reference to FIG. 14, each of the first internal electrodes 1061 and the internal electrodes 1062 has one conductive pattern 1611, 1621. In each conductive pattern 1611, 1621, two slots 1612, 1613 or 1622, 1623 are formed with the two slots aligned on a line. Further, the slots 1612, 1613 in the conductive pattern 1611 of the first internal electrode 1061 are perpendicular to the slots 1622, 1623 in the conductive pattern 1621 of the second internal electrode 1062. In this case, electrical currents in directions perpendicular flow between the first internal electrode and the second electrode, thus canceling the magnetic fluxes. The symbols 1614 and 1624 denote leads.

Figure 15:
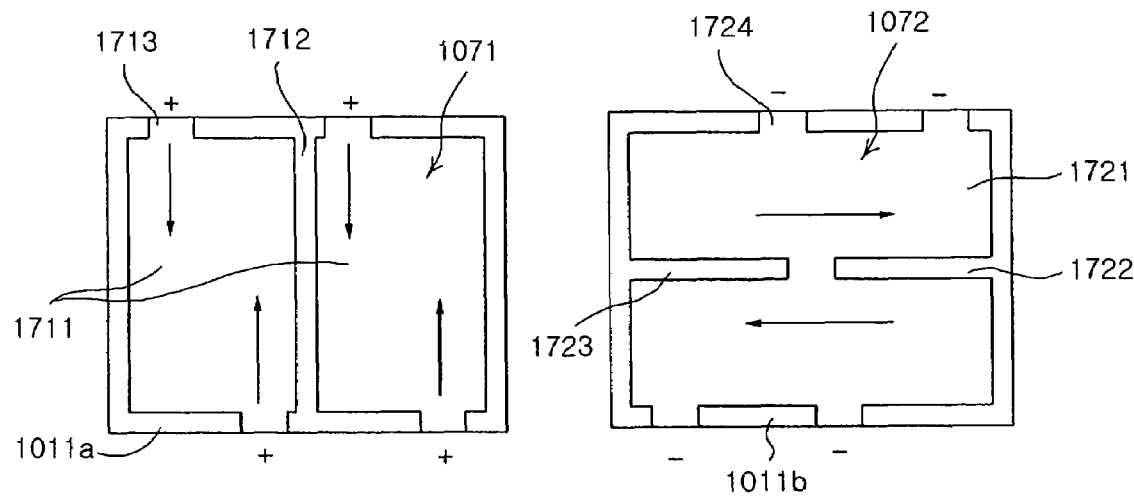
FIG. 15 is a plane view showing internal electrodes of a multilayer chip capacitor in accordance with a fourth embodiment of the present invention.

FIG. 15 is a plane view showing internal electrodes of a multilayer chip capacitor in accordance with a fourth embodiment of the present invention. With reference to FIG. 15, the first internal electrode 1071 has a pair of conductive patterns 1711 divides by a slot 1712. The second internal electrode 1072 has one conductive pattern 1721 in which two slots 1722, 1723 aligned on a line are formed. The slot 1712 of the first electrode 1071 is perpendicular to the slots 1722, 1723 formed in the conductive pattern 1721. Therefore, electrical currents in directions perpendicular flow between the first internal electrode and the second electrode, thus canceling the magnetic fluxes. The symbols 1713 and 1724 denote leads.

Figure 16:
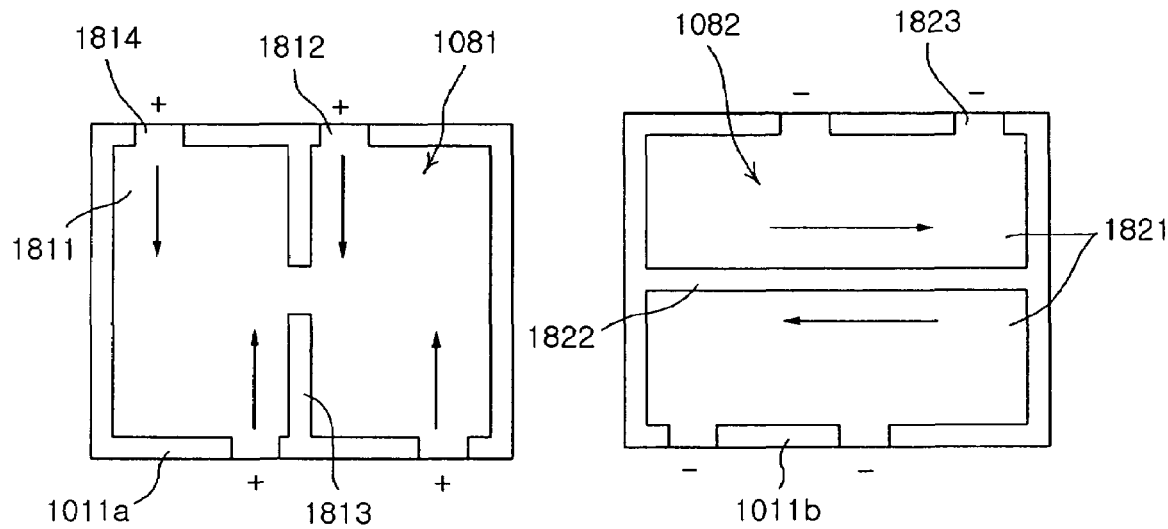
FIG. 16 is a plane view showing internal electrodes of a multilayer chip capacitor in accordance with a fifth embodiment of the present invention.

FIG. 16 is a plane view showing internal electrodes of a multilayer chip capacitor in accordance with a fifth embodiment of the present invention. With reference to FIG. 16, the first internal electrode 1081 has one conductive pattern 1811 in which two slots 1813 aligned are formed. The second internal electrode 1082 has two conductive pattern 1821 divided by a slot 1822. The slots 1813 are perpendicular to the slot 1822. Therefore, electrical currents in directions perpendicular flow between the first internal electrode and the second electrode, thus canceling the magnetic fluxes. The symbols 1812, 1814 and 1823 denote leads.

Figure 17:
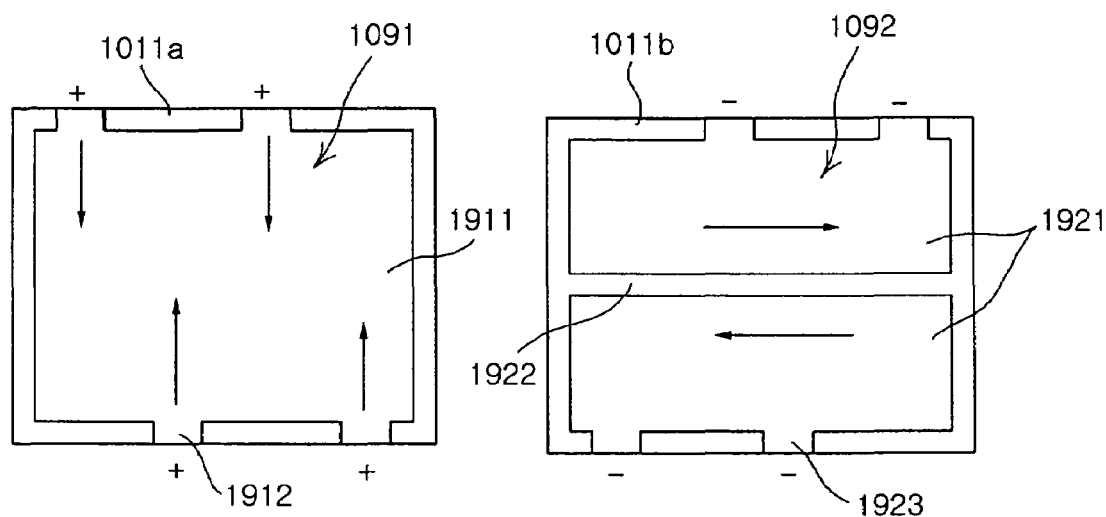
FIG. 17 is a plane view showing internal electrodes of a multilayer chip capacitor in accordance with a sixth embodiment of the present invention.
Figure 18:
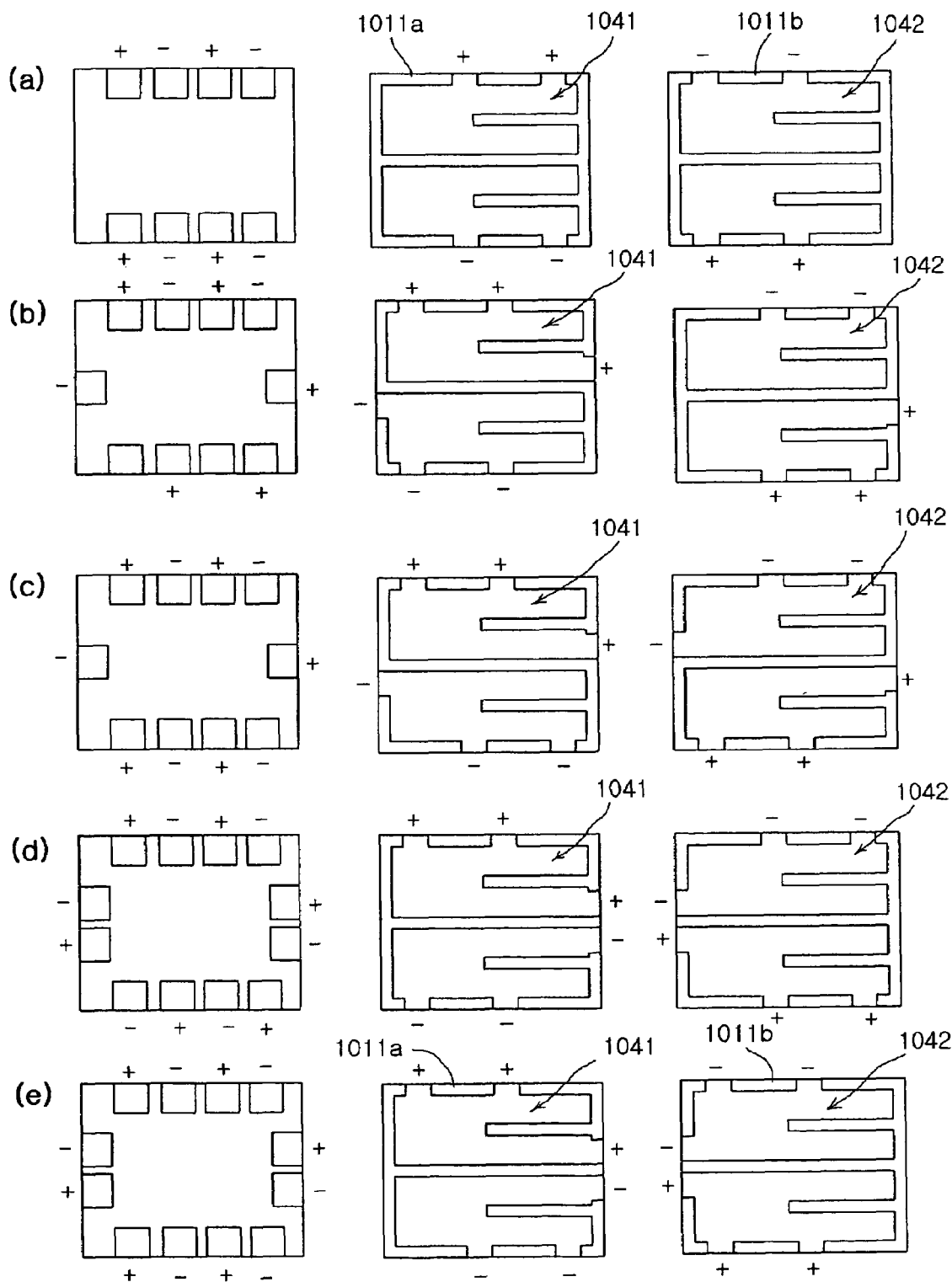
FIGS. 18 to 21 are plane views showing arrangements of external electrodes and internal electrodes of multilayer chip capacitors in accordance with various embodiments of the present invention.
Figure 19:
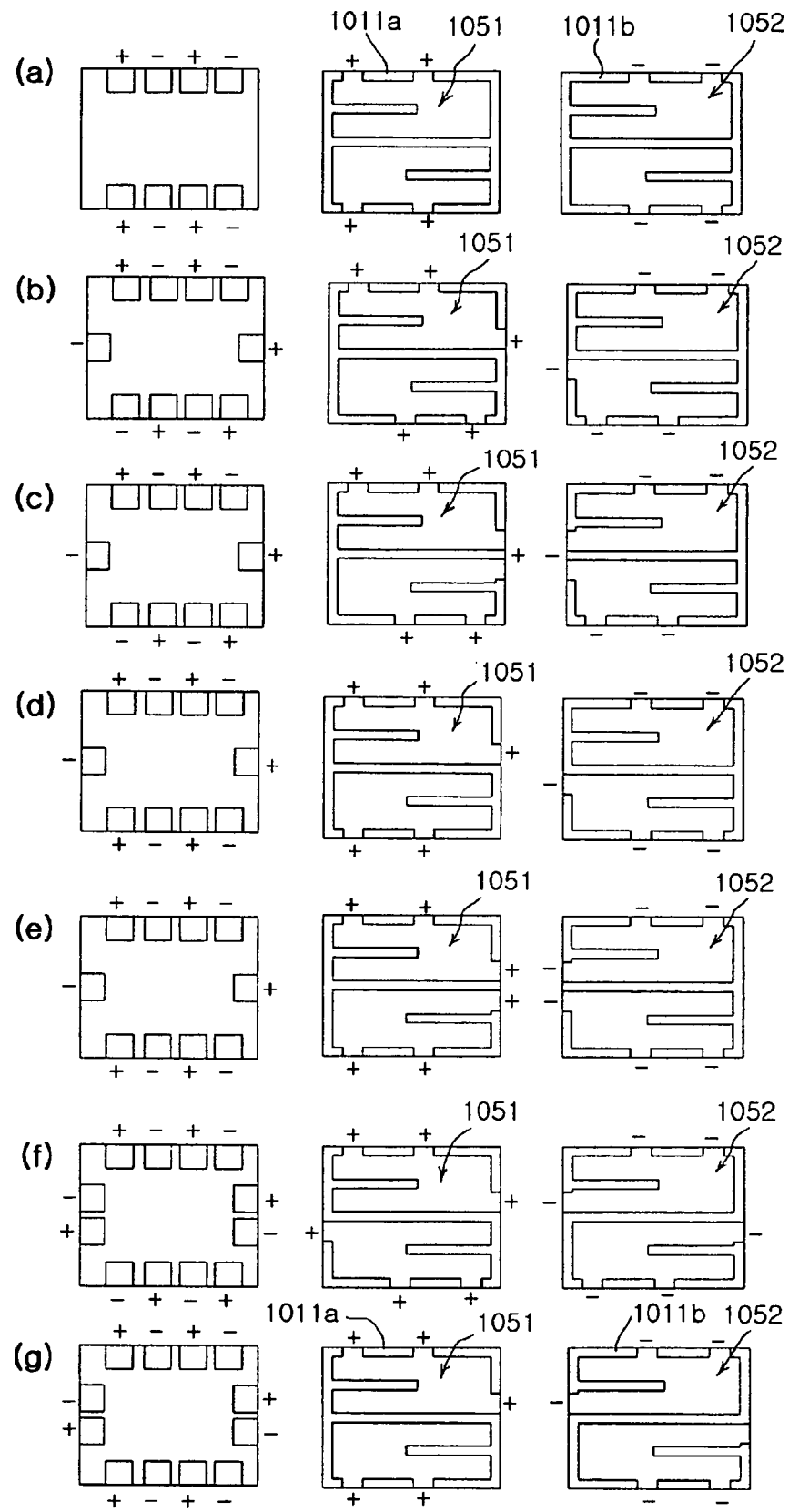
Figure 20:
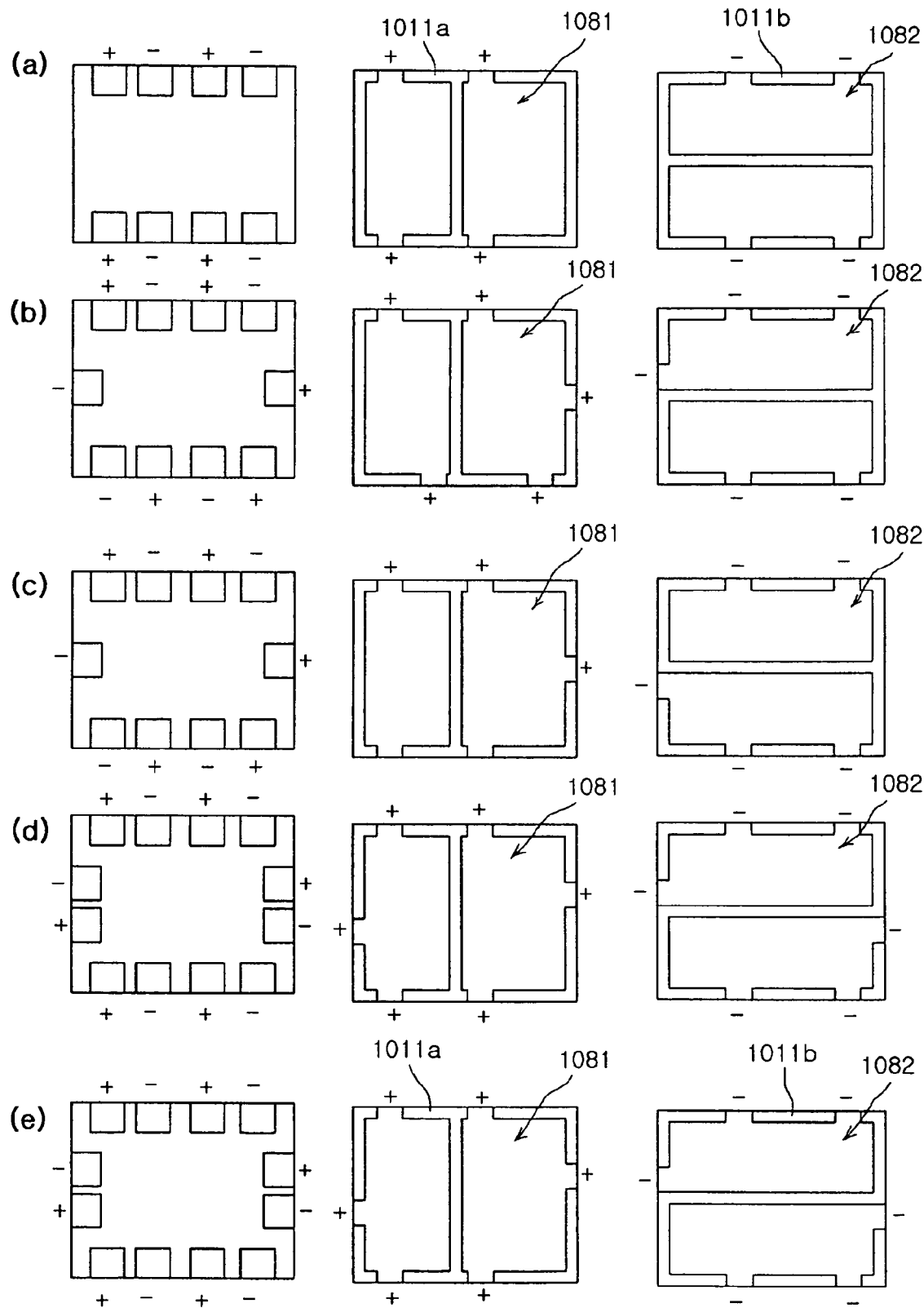
Figure 21:
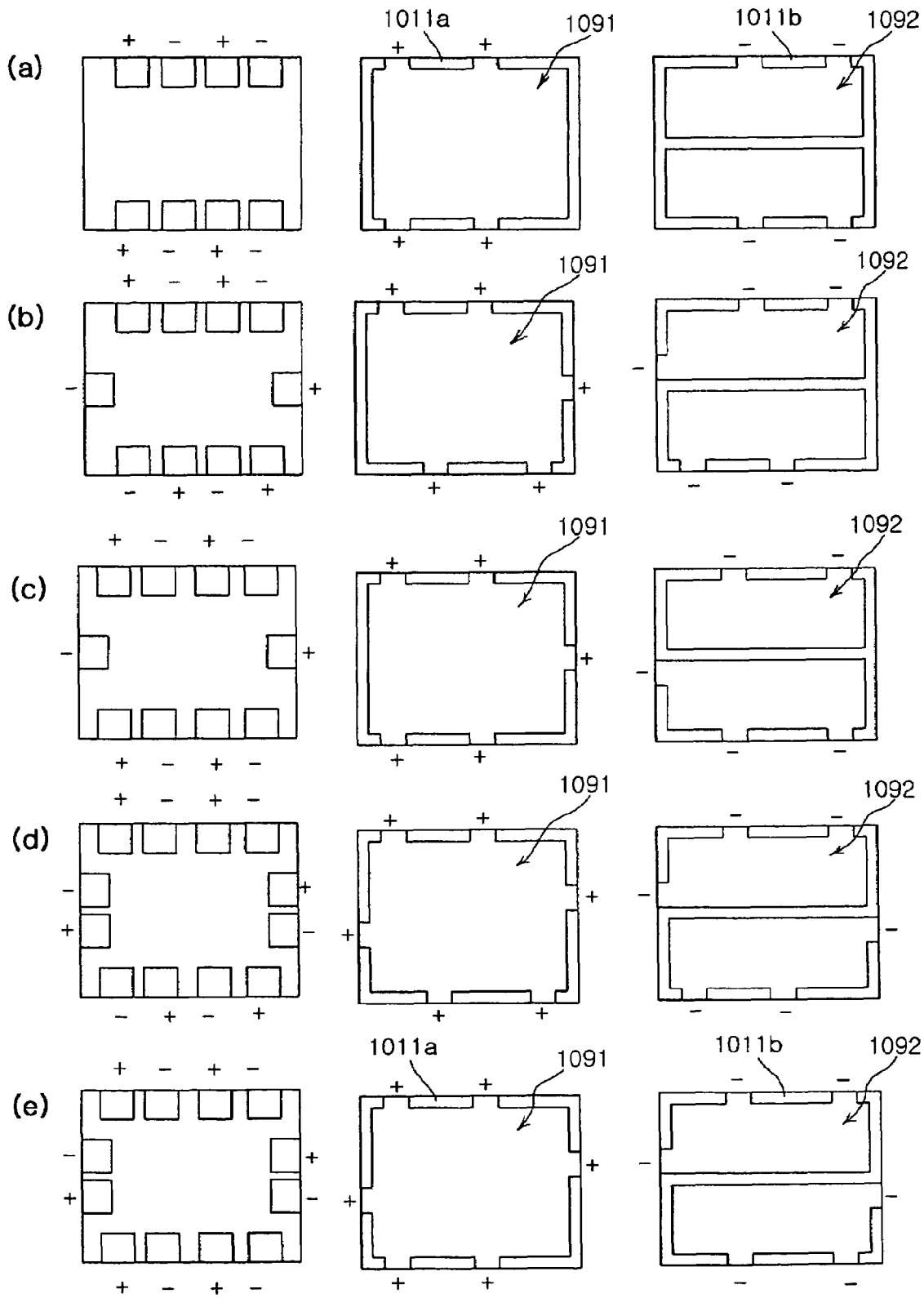

FIG. 17 is a plane view showing internal electrodes of a multilayer chip capacitor in accordance with a sixth embodiment of the present invention. With reference to FIG. 17, the first electrode 1091 has one conductive pattern 1912 without a slot. The second electrode 1092 has a pair of conductive pattern 1921 divided by a slot 1922. In this case electrical currents in directions perpendicular also flow between the first internal electrode and the second internal electrode, thus canceling the magnetic fluxes. The symbols 1912 and 1913 denote leads.

FIGS. 18 to 21 are plane views showing arrangements of external electrodes and internal electrodes of multilayer chip capacitors in accordance with various embodiments of the present invention. In FIGS. 18 to 21, the left columns illustrate external electrodes, the center columns illustrate first internal electrodes, and the right columns illustrate second internal electrodes. In accordance with the embodiments shown in FIGS. 18 to 21, electrical currents of different directions flow between the first and second internal electrodes, between a pair of conductive patterns divided by a slot, and within a conductive pattern with one or more slots. Further the slot formed in a conductive pattern elongates the current path, thus prevents the ESR from reducing extremely. Still further, by selecting a proper length of the slot, it is possible to control the ESR.

EXAMPLE

Figure 1C:
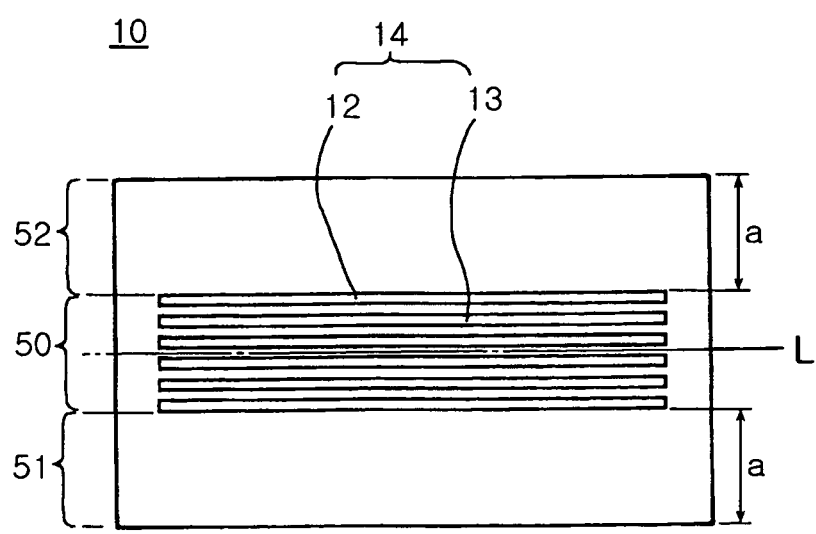
FIG. 1c is a sectional view of the multilayer chip capacitor of FIG. 1b as taken along the line X–X'.
Figure 1D:
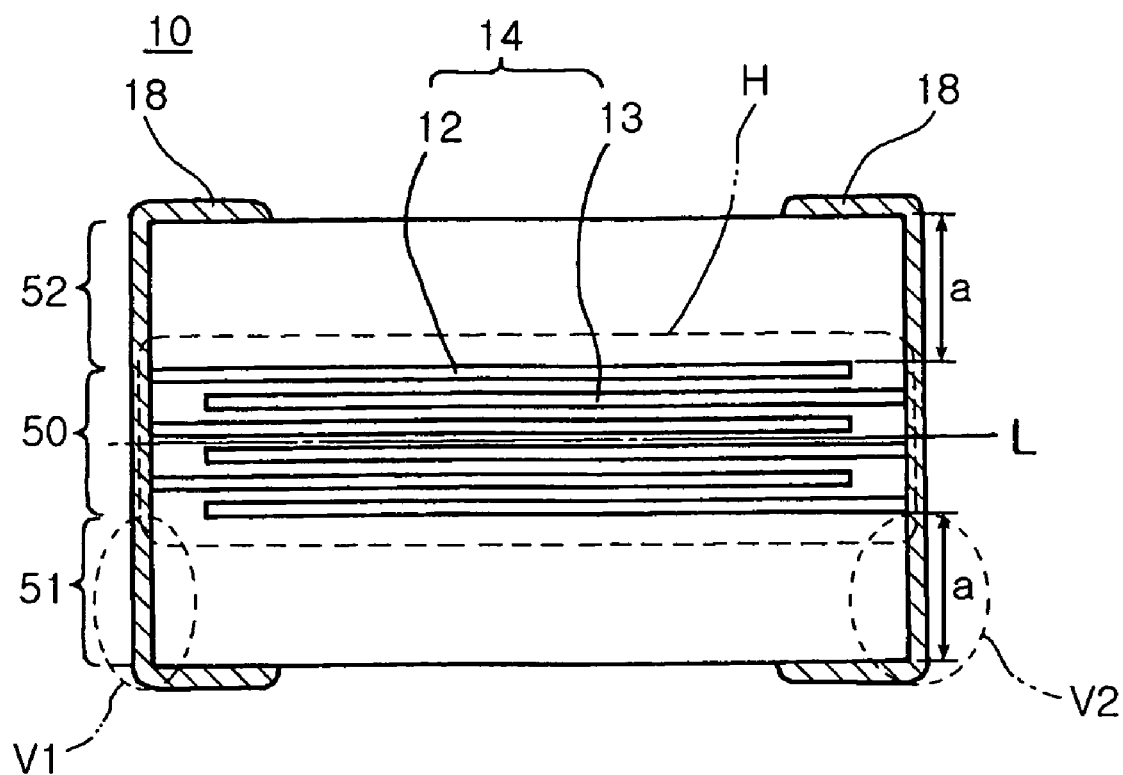
FIG. 1d is a sectional view of the multilayer chip capacitor of FIG. 1b as taken along the line A–A'.
Figure 1E:
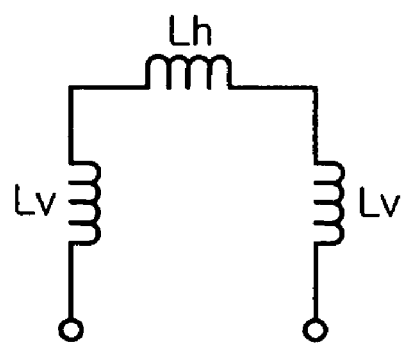
FIG. 1e is a schematic view showing a model of the equivalent serial inductance of the multilayer chip capacitor of FIG. 1d.
Figure 2:
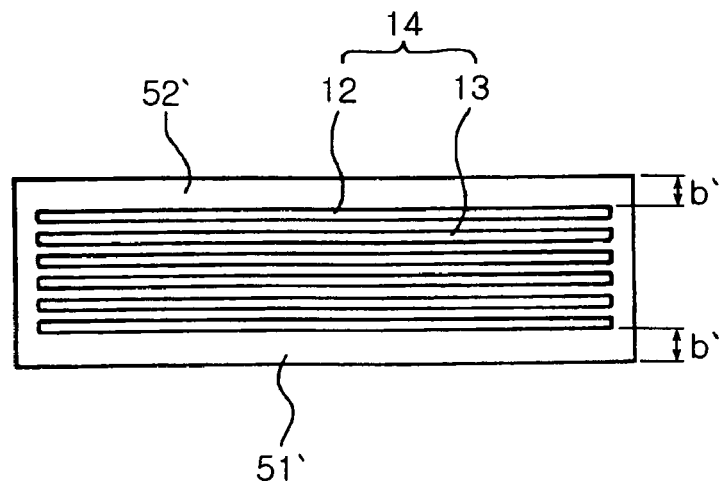
FIG. 2 is a sectional view illustrating another conventional multilayer chip capacitor.

The applicant performed an experiment, which compared ESL characteristics of a conventional multilayer chip capacitor and multilayer chip capacitors in accordance with three examples (a first though third examples) of the present invention in order to inspect the improvement of the ESL characteristics of the multilayer chip capacitors of the present invention. The conventional multilayer chip capacitor has the internal electrode structure shown in FIG. 1a and the symmetrical sectional structure shown in FIG. 1c. The capacitors of the first through third examples have the internal electrode structure shown in FIG. 13. The multilayer chip capacitor of the first example has the lower-upper asymmetrical sectional structure shown in FIG. 4, the capacitor of the second example has the lower-upper asymmetric sectional structure shown in FIG. 10, and the capacitor of the third example has the lower-upper symmetric sectional structure shown in FIG. 11. All of the conventional multilayer chip capacitor and the multilayer chip capacitors of the tree examples of the present invention have eight external electrodes.

The conventional multilayer chip capacitor and the multilayer chip capacitors of the three examples have a size of 2.0 mm×1.25 mm, and a height of 0.85 mm. Particularly, the multilayer chip capacitors of the three examples of the present invention comprises a lower dummy layer having a thickness of 50 μm, respectively. On the other hand, the conventional multilayer chip capacitor comprises a lower dummy layer and a upper dummy layer having a thickness of more than 350 mm. The conventional multilayer chip capacitor and the multilayer chip capacitors the tree examples of the present invention use nickel (Ni) electrodes as internal electrodes and copper (Cu) electrodes as external electrodes. Capacitances of the conventional multilayer chip capacitor and the multilayer chip capacitors of the tree examples of the present invention are all 1 μF.

Table 1 illustrates results of ESL of the conventional multilayer chip capacitor and the multilayer chip capacitors of the tree examples of the present invention, which were obtained from the above experiment.

TABLE 1

|  | Conventional capacitor | The first example | The second example | The third example |
| --- | --- | --- | --- | --- |
| Capacitance | 1 μF | 1 μF | 1 μF | 1 μF |
| ESL | 70 pH | 25 pH | 25 pH | 30 pH |

As stated in Table 1, the ESL characteristics of the multilayer chip capacitors the three examples of the present invention are highly improved, compared to the ESL characteristics of the conventional multilayer chip capacitor. As stated in Table 1, the ESL values of the multilayer chip capacitors of the first and the second examples of the present invention are reduced by approximately 65%, compared to the ESL value of the conventional multilayer chip capacitor. The ESL value of approximately 25 pH can not be obtained in the conventional multilayer chip capacitor having eight external electrodes. In the case that the conventional multilayer chip capacitor is used, an ESL value of less than 30 pH can be obtained so long as the conventional multilayer chip capacitor has at least twelve external electrodes. However, in the case that the number of the external electrodes of the capacitor is increased, the pitch between the external electrodes is narrowed, thereby easily causing electric shorts between the external electrodes when the capacitor is mounted on a substrate. Consequently, the use of the multilayer chip capacitor having eight external electrodes in accordance with the present invention rather than the use of the conventional multilayer chip capacitor having at least twelve external electrodes is advantageous. For reference, in the case that a multilayer chip capacitor comprises a lower dummy layer having a thickness larger than a thickness of a upper dummy layer, the ESL value of the multilayer chip capacitor is approximately 100 pH.

As apparent from the above description, the present invention provides a multilayer chip capacitor, in which the thickness of a lower dummy layer is smaller than the thickness of an upper dummy layer, thereby reducing ESL generated due to current flowing from external electrodes, thus reducing the overall ESL of the capacitor. Further, the multilayer chip capacitor of the present invention has a sufficient thickness, thus reinforcing the mechanical strength of the capacitor. Accordingly, when the multilayer chip capacitor is used in a high-frequency circuit, it is possible to improve electrical characteristics of the high-frequency circuit and to prevent the capacitor from being mechanically broken.

In addition, by forming one or more slot in the internal electrodes, the ESR is prevented from reducing extremely and it is possible to control the ESR to the desired value.

Therefore it is easy to meet the target impedance and design the power distribution network more stably.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A multilayer chip capacitor, comprising:
    an upper dummy layer and a lower dummy layer;
    a plurality of first and second internal electrodes interposed between the upper and lower dummy layers, each of the internal electrodes having at least two leads; and
    at least four external electrodes connected to the internal electrodes via the leads;
    wherein
    the thickness of the lower dummy layer is smaller than the thickness of the upper dummy layer;
    the first and second internal electrodes are separated by dielectric layers and alternately stacked; and
    said upper dummy layer defines an uppermost portion of said capacitor and is free of conductive materials.

2. The multilayer chip capacitor as set forth in claim 1, wherein the ratio of the thickness of the lower dummy layer to the thickness of the upper dummy layer is 0.8 or less.

3. The multilayer chip capacitor as set forth in claim 1, wherein upper and lower surfaces of the capacitor exhibit different colors.

4. The multilayer chip capacitor as set forth in claim 1, further comprising a mark for distinguishing between upper and lower surfaces of the capacitor, said mark being on the upper surface of the capacitor.

5. The multilayer chip capacitor as set forth in claim 4, wherein the mark is made of colored glass.

6. The multilayer chip capacitor as set forth in claim 1, wherein the upper and lower dummy layers are made of the same material as that of the dielectric layers disposed between the first and second internal electrodes.

7. The multilayer chip capacitor as set forth in claim 1, wherein the upper dummy layer includes:
    an upper dummy dielectric layer made of the same material as that of the dielectric layers disposed between the first and second internal electrodes; and
    an upper reinforcing layer formed on the upper dummy dielectric layer, the upper reinforcing layer being made of a material different from that of the dielectric layers disposed between the first and second internal electrodes.

8. The multilayer chip capacitor as set forth in claim 7, wherein the upper reinforcing layer is made of plastic, glass, or ceramic.

9. The multilayer chip capacitor as set forth in claim 1, wherein a cross section of the multilayer chip capacitor is asymmetric with respect to a median plane of said capacitor.

10. A multilayer chip capacitor, comprising:
    an upper dummy layer and a lower dummy layer;
    a plurality of first and second internal electrodes interposed between the upper and lower dummy layers, each of the internal electrodes having at least two leads; and
    at least four external electrodes connected to the internal electrodes via the leads,
    wherein the thickness of the lower dummy layer is smaller than the thickness of the upper dummy layer,
    the first and second internal electrodes are separated by dielectric layers and alternately stacked, and
    either or both of the first and second internal electrodes have one or more slots.

11. The multilayer chip capacitor as set forth in claim 10, wherein each of the first and second internal electrodes has a pair of adjacent rectangular conductive patterns,
    in each of the conductive patterns of each said pair, one or more slots are formed to extend from one or more sides toward the center of the conductive pattern to change a direction of an electric current path within the conductive pattern, and
    the directions of the electric current paths through adjacent areas of the conductive patterns of each said pair are opposite to each other.

12. The multilayer chip capacitor as set forth in claim 11, wherein the conductive patterns of each said pair have the same polarity.

13. The multilayer chip capacitor as set forth in claim 11, wherein the conductive patterns of each said pair have different polarities.

14. The multilayer chip capacitor as set forth in claim 10, wherein directions of electric current paths in the first and the second internal electrodes are perpendicular to each other.

15. The multilayer chip capacitor as set forth in claim 14, wherein
    each of the first internal electrodes has a first rectangular conductive pattern in which two first slots extending from two opposing sides of the first conductive pattern toward the center of the first conductive pattern are formed, and
    each of the second internal electrodes has a second rectangular conductive pattern in which two second slots perpendicular to the first slots of the first conductive pattern are formed, the second slots of the second conductive pattern extending from two opposing sides of the second conductive pattern toward the center of the second conductive pattern.

16. The multilayer chip capacitor as set forth in claim 14, wherein
    each of the first electrodes has a pair of first conductive patterns which are divided by a first slot, and
    each of the second electrodes has a rectangular second conductive pattern, wherein two second slots perpendicular to the first slot are formed in the second conductive pattern, the second slots extending from opposing sides of the second conductive pattern toward the center of the second conductive pattern.

17. The multilayer chip capacitor as set forth in claim 14, wherein
    each of the first electrodes has a first conductive pattern, and
    each of the second electrodes has a pair of second conductive patterns divided by a slot.

18. The multilayer chip capacitor as set forth in claim 10, wherein said upper dummy layer defines an uppermost portion of said capacitor and is free of conductive materials.

* * * * *